L. G. HOBGOOD.
SUPPLEMENTARY SEAT FOR MOTOR CYCLES.
APPLICATION FILED MAY 2, 1914.
1,212,221.
Patented Jan. 16, 1917.
2 SHEETS—SHEET 2.
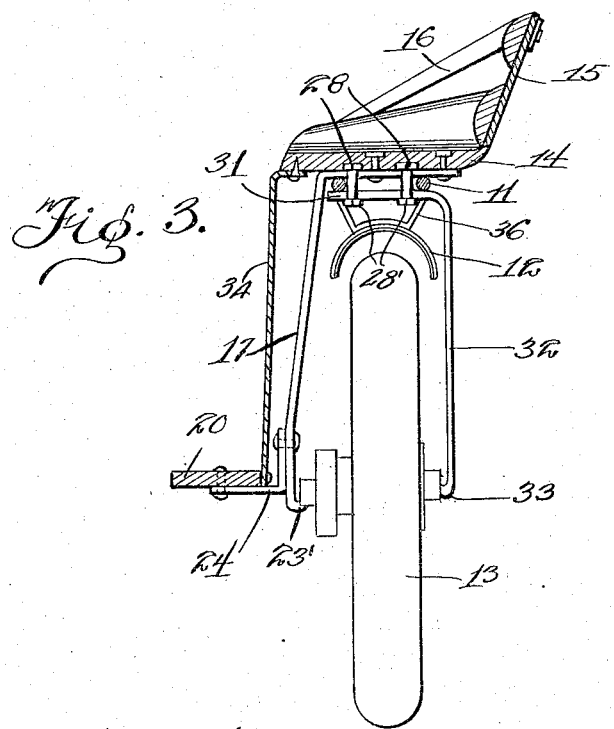
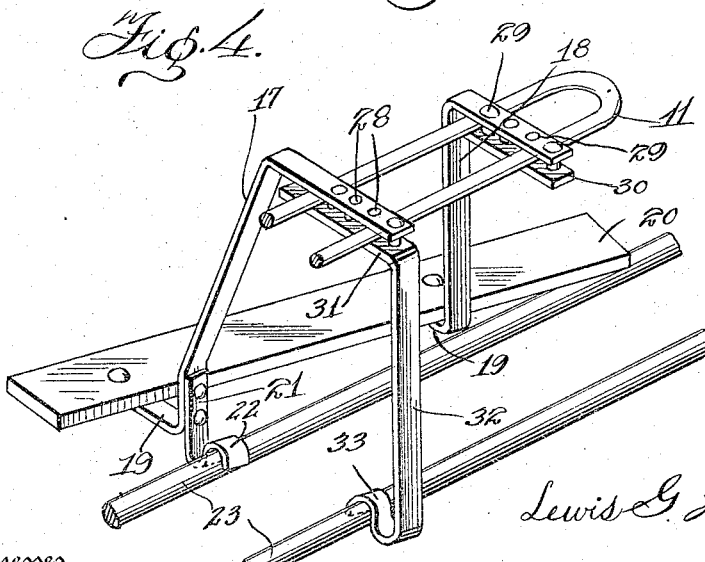

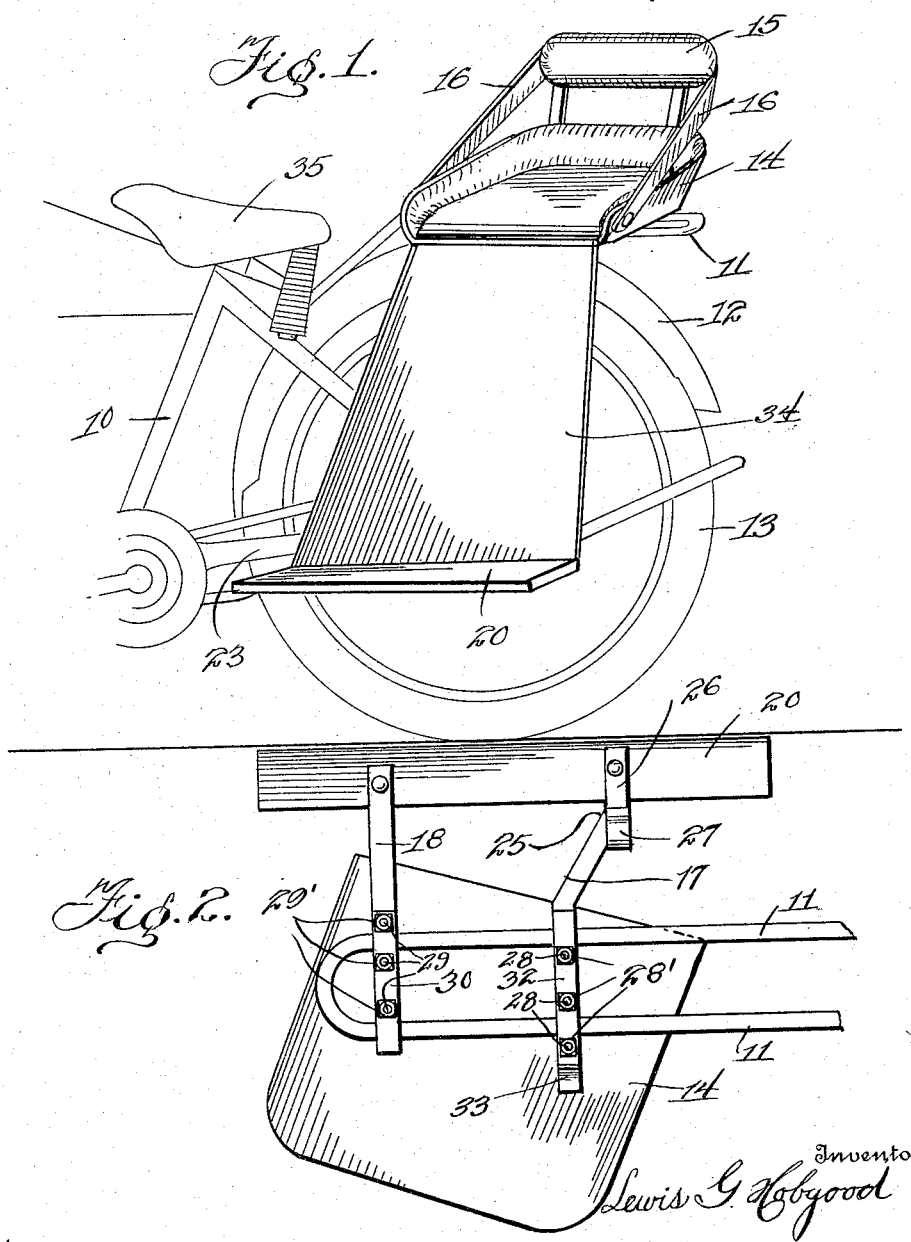

UNITED STATES PATENT OFFICE.

LEWIS GARLAND HOBGOOD, OF COLUMBIA, SOUTH CAROLINA.

SUPPLEMENTARY SEAT FOR MOTOR-CYCLES.

1,212,221.  Specification of Letters Patent.  Patented Jan. 16, 1917.

Application filed May 2, 1914. Serial No. 835,939.

*To all whom it may concern:*

Be it known that I, LEWIS G. HOBGOOD, a citizen of the United States, residing at Columbia, in the county of Richland and State of South Carolina, have invented certain new and useful Improvements in Supplementary Seats for Motor-Cycles, of which the following is a specification.

This invention relates to a supplementary seat for a motor cycle, or like vehicle, and the principal object of the invention is to provide a seat which may be removably connected with the motor cycle frame above the mud guard of the rear wheel, the seat being so constructed that the person occupying the seat will be very comfortable and the clothes of the occupant will be protected from dust and dirt thrown up by the rear wheel.

Another object of the invention is to so construct this supplementary seat that it may be connected to the luggage carrier usually provided upon motor cycles, the supports of the seat having their upper ends secured to the luggage carrier and their lower ends connected with the rear forks of the motor cycle.

Another object of the invention is to provide a seat of the character described which can be cheaply made, which will be very strong and durable, and which will be securely held in place when connected with the motor cycle.

This invention is illustrated in the accompanying drawings wherein—

Figure 1 is a perspective view showing the improved seat applied to a motor cycle; Fig. 2 is a bottom plan view showing one form of the improved seat; Fig. 3 is a view partially in section and partially in elevation showing a seat of a slightly modified construction connected with a motor cycle; Fig. 4 is a perspective view of a support for a seat such as shown in Fig. 1 with the chair and apron removed, the support being connected with the luggage carrier of a motor cycle and providing a right-hand seat support instead of a left-hand seat support as shown in Fig. 1.

In the drawings only a portion of the motor cycle has been shown as it is not essential to illustrate the entire motor cycle in order to show the manner of connecting the improved seat with the motor cycle. In these drawings the numeral 10 indicates the motor cycle frame in general and the numeral 11 indicates the usual luggage carrier which extends above the guard 12 of the rear or driving wheel 13.

The seat 14 is provided with a back 15 and braces 16 which brace the back and also form the arm rests. This seat 14 is secured to the upper end portions of the supporting legs 17 and 18 by any suitable means. These supporting legs 17 and 18 extend downwardly and have their lower end portions 19 bent to extend outwardly to form supports for the foot-board 20.

In Fig. 4 there is shown a short strip 21 which is secured to the lower end portion of the leg 17 and has its free end portion bent to form a hook 22 intended to engage one of the rear fork members 23 of the motor cycle and support the seat.

In Fig. 3 there has been shown a slightly modified construction in which the lower end portion of the leg 17 is bent to form the hook 23' which corresponds to the hook 22, and in which the foot-board 20 is supported by a bracket 24 carried by the leg 17.

In Fig. 2 there has been shown still another modification. In this form the lower end portion of the leg 17 is bent to one side as shown at 25, and then bent outwardly as shown at 26, and secured to the foot-board. Before being secured to the foot-board, the strip from which the leg 17 is formed could be bent back upon itself and then bent to form the hook 27 corresponding to the hook 22, or the hook 27 could be formed from a separate piece of material similar to the hook 22 and secured between the foot-board 20 and the end portion 26 of the leg 17.

When using this seat it will be put in place as shown in Figs. 1 and 3 with the hook 33 of the supporting leg 32 resting upon the rear fork of the motor cycle upon one side of the wheel and with the hook of the leg 17 engaging the rear fork of the motor cycle upon the opposite side of the rear wheel. When in this position the upper end portion of the legs 17 and 18 will rest upon the upper face of the luggage carrier 11 and the arm 31 of the leg 32 will pass beneath the luggage carrier with the bolts 28 extending through openings formed in this arm. The securing nuts 28' will now be put in place upon the bolts 28 after which the strip 30 may be placed beneath the luggage carrier with bolts 29 extending through openings formed therein and the nuts 29' screwed upon the bolts 29 and tightened.

The auxiliary seat will now be put in place and will be securely connected with the luggage carrier. When it is desired to remove the auxiliary seat it is simply necessary to remove the securing nuts 28' and 29' and the strip 30 and leg 32 will then be disconnected thus permitting the seat to be removed from the luggage carrier carrying with it legs 17 and 18. In order to protect the occupant of the seat from dust and dirt, and to prevent danger of a lady's skirt becoming caught in the rear wheel, there has been provided an apron 34 which extends from the seat to the foot-board 20.

When using this seat, one person will occupy the saddle 35 and operate the motor cycle and a second person will occupy the seat 14. The hooks 22 and 33 will rest upon the rear fork members and thus the baggage carrier 11 will be braced and the weight of the person prevented from bending the luggage carrier out of shape. This will further prevent the weight of the person from bending the mud guard. Of course, if the supporting legs 17 and 32 are formed of resilient material they will permit sufficient give to take up jolts. I have thus provided a seat which is securely connected with the luggage carrier and which is so constructed and connected with the motor cycle that it is yieldable and at the same time strong and not liable to work loose or out of place. I have also provided a seat which can be quickly put in place or removed and which can be very cheaply manufactured. It should also be noted that the seat is so constructed that the occupant will be protected from dust and dirt thrown up by the rear wheel, and that the apron 34 will prevent the clothes of the occupant from becoming caught in the rear wheel and being smeared by grease with which the rear wheel is lubricated.

What is claimed is:

1. An auxiliary seat of the character described comprising a chair, a foot-board, supports secured to said chair and to said foot-board, a protector extending from said chair to said foot-board, a clamping strip connected with one of said supports, a hook provided adjacent the lower end of the second support, and a support having its lower end portion provided with a hook and having its upper end portion connected with the upper end portion of said last-mentioned support to constitute a clamping element to coöperate with the upper end portion of said last-mentioned support.

2. An auxiliary seat for a motor-cycle including rear fork members and a luggage carrier comprising a chair, supports for said chair having their upper ends positioned above said luggage carrier, a foot rest connecting the lower ends of said supports, a clamping strip extending beneath said luggage carrier, bolts carried by one of said supports and engaging said clamping strip to hold the upper end of the support in tight engagement with the luggage carrier, a third support having its upper end portion extending beneath said luggage carrier and beneath the upper end portion of the remaining one of said first mentioned supports, bolts carried by the upper end portion of said last mentioned support and engaging the upper end portion of the third support to hold the two supports in tight engagement with the luggage carrier above and below the same, and means adjacent the lower end portions of said first mentioned supports engaging the rear fork members of the motor-cycle.

3. A seat of the character described comprising a chair, supports carried by said chair, a foot rest carried by said supports, a protector leading from said foot-rest to said chair, clamping members coöperating with said supports, one of said clamping members being extended to form a support, and attaching means positioned adjacent the lower end of said last-mentioned support and one of said first-mentioned supports.

4. An auxiliary seat for a motor cycle provided with a frame including a rear fork and a luggage carrier, said auxiliary seat comprising a chair, supports carried by said chair and resting upon said luggage carrier, a foot-rest carried by said supports, means for clamping one of said supports to said luggage carrier, a third support extending beneath said luggage carrier and connected with the upper end portion of one of said first-mentioned supports to clamp the same to said luggage carrier, and means provided adjacent the lower ends of said last-mentioned supports for engaging the rear forks of said motor cycle.

5. An auxiliary seat for a motor cycle including a rear fork and a luggage carrier, said seat comprising a chair, supports for said chair constituting clamps for removably connecting said chair with said luggage carrier, a foot-rest carried by certain of said supports, a guard leading from said chair to said foot-rest, and means adjacent the lower ends of certain of said supports for engaging the rear fork of said motor cycle.

In testimony whereof I affix my signature in presence of two witnesses.

LEWIS GARLAND HOBGOOD.

Witnesses:
  J. H. HAMMOND,
  R. L. SHULER.